United States Patent
Park et al.

(10) Patent No.: US 10,414,452 B2
(45) Date of Patent: Sep. 17, 2019

(54) SYSTEM AND METHOD FOR VEHICLE INSPECTION

(71) Applicants: HYUNDAI MOTOR COMPANY, Seoul (KR); KIA MOTORS CORPORATION, Seoul (KR)

(72) Inventors: Jihoon Park, Suwon-si (KR); David Oh, Gunpo-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 15/822,988

(22) Filed: Nov. 27, 2017

(65) Prior Publication Data

US 2019/0054966 A1 Feb. 21, 2019

(30) Foreign Application Priority Data

Aug. 17, 2017 (KR) .................. 10-2017-0104237

(51) Int. Cl.
| | |
|---|---|
| *B62D 65/00* | (2006.01) |
| *G07C 5/00* | (2006.01) |
| *G05D 1/00* | (2006.01) |
| *H04N 7/18* | (2006.01) |
| *G06T 7/73* | (2017.01) |

(Continued)

(52) U.S. Cl.
CPC ......... *B62D 65/005* (2013.01); *G05D 1/0033* (2013.01); *G05D 1/0223* (2013.01); *G06T 7/001* (2013.01); *G06T 7/74* (2017.01); *G07C 5/006* (2013.01); *G07C 5/008* (2013.01); *H04N 7/183* (2013.01); *G05D 2201/0213* (2013.01);

(Continued)

(58) Field of Classification Search
CPC ......... B62D 65/005; G06T 7/001; G06T 7/74; G06T 2207/30232; G06T 2207/30252; G07C 5/008; G07C 5/006; G05D 1/0223; G05D 1/0033; G05D 2201/0213; H04N 7/183

See application file for complete search history.

(56) References Cited

U.S. PATENT DOCUMENTS

| | | | | |
|---|---|---|---|---|
| 6,324,749 B1 * | 12/2001 | Katsuura | ............... | B23P 21/004 29/402.01 |
| 6,859,677 B2 * | 2/2005 | Mitterholzer | .... | G05B 19/41875 700/110 |
| 8,700,205 B2 * | 4/2014 | Scheuerman | .......... | B62D 65/18 700/218 |

FOREIGN PATENT DOCUMENTS

| | | | |
|---|---|---|---|
| JP | 62-236632 | * | 10/1987 |
| JP | 2006-129216 | * | 5/2006 |

* cited by examiner

*Primary Examiner* — Michael J Zanelli
(74) *Attorney, Agent, or Firm* — Brinks Gilson & Lione

(57) ABSTRACT

The present disclosure provides a system and method for vehicle inspection. The system for vehicle inspection installed on an inspection line to inspect an assembled vehicle may include: a wireless terminal connected to the vehicle and configured to externally transmit vehicle state information; an antenna arranged on the inspection line and configured to relay wireless communication of the wireless terminal; a camera arranged upwardly along the inspection line and configured to transmit image information of a photographed vehicle; and a server configured to set a coordinates system and a reference driving line on the inspection line, generate drive control information based on the image information and the vehicle state information such that the vehicle moves along the reference driving line, and transmit the drive control information to the wireless terminal.

20 Claims, 9 Drawing Sheets

(51) Int. Cl.
*G05D 1/02* (2006.01)
*G06T 7/00* (2017.01)
(52) U.S. Cl.
CPC ............... *G06T 2207/30232* (2013.01); *G06T 2207/30252* (2013.01)

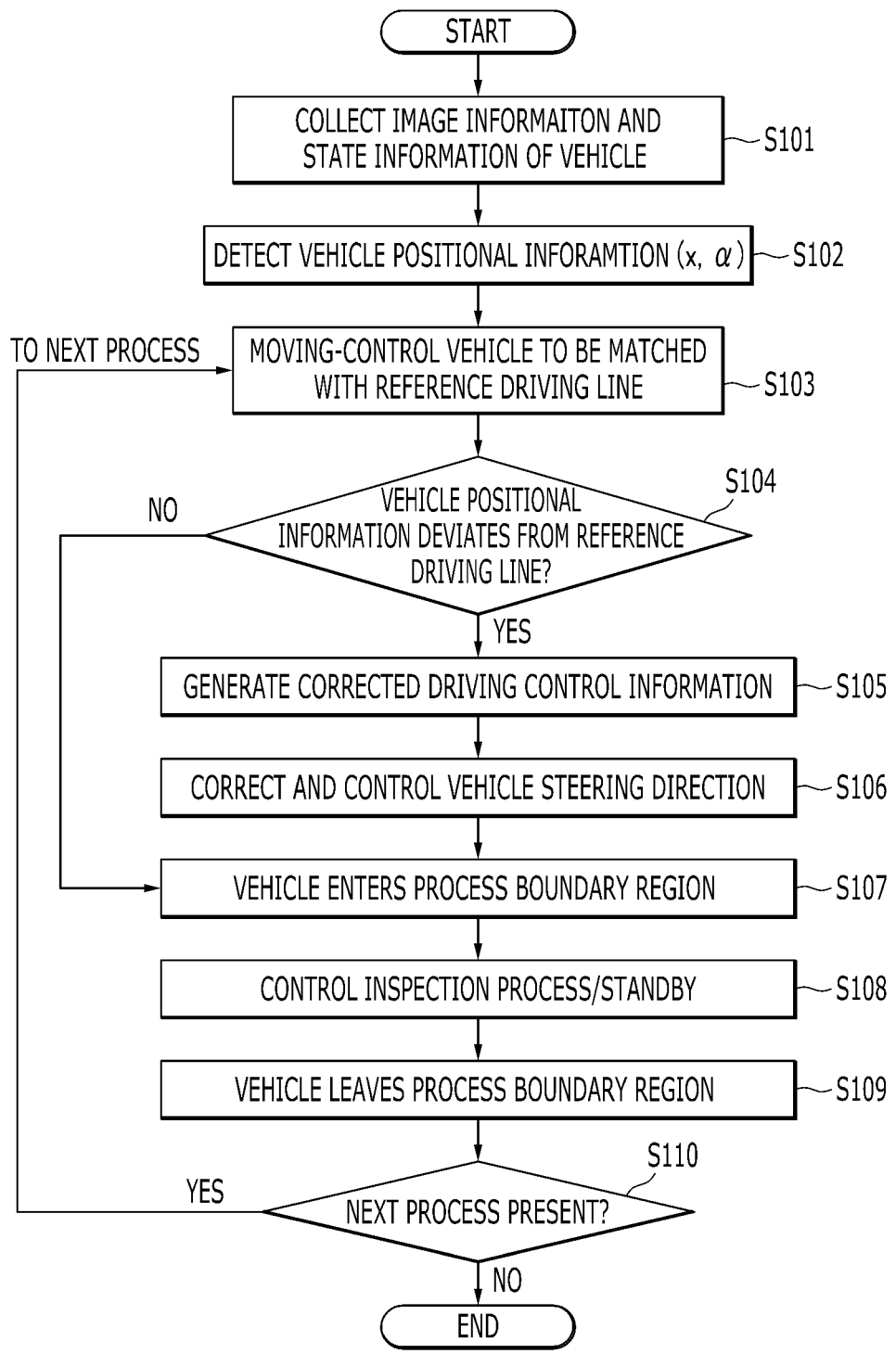

SYSTEM AND METHOD FOR VEHICLE INSPECTION

CROSS-REFERENCE TO RELATED APPLICATION

The present application claims priority to and the benefit of Korean Patent Application No. 10-2017-0104237, filed on Aug. 17, 2017, which is incorporated herein by reference in its entirety.

FIELD

The present disclosure relates to a system for vehicle inspection, and more particularly, to a system and method for vehicle inspection for inspecting an assembly state while moving a vehicle in an inspection line.

BACKGROUND

The statements in this section merely provide background information related to the present disclosure and may not constitute prior art.

In general, a manufacturing process of a vehicle is performed by bonding various components such as a vehicle body panel via welding. Then, coating and anticorrosion operations on the completed vehicle body over a surface of each component is performed in a coating process.

Then, components of a transmission system, and components of suspension, steering, and brake systems are assembled. Thereafter, a design process of assembling a door, a trunk lid, a hood, etc. is performed.

A vehicle in the assembly completion process is moved to an inspection line for various inspections and is inspected using various inspection apparatuses installed on the inspection line.

For example, the inspection line includes installations of a conveyer, a transfer, and a turntable, and a worker performs wheel alignment inspection, roll & brake inspection, etc. while directly moving a vehicle using the equipment.

However, conventionally, since a worker directly drives a vehicle and performs inspection, quality varies in an inspection result due to a human error and, thus, the associated labor costs may be increased.

Conventionally, since a vehicle is moved using a large-sized installation of a conveyor, a transfer, and a turntable, facility investment costs may be excessively increased and, thus, an additional process may be required to unload a vehicle when the vehicle needs to be repaired due to an inspection error and a worker needs to directly drive the vehicle to the turntable for unload.

In addition, a cycle time of an inspection process may be increased due to an operation time of a conveyor and a transfer.

The above information disclosed in this section is only for enhancement of understanding of the background of the disclosure and therefore it may contain information that does not form the prior art that is already known in this country to a person of ordinary skill in the art.

SUMMARY

The present disclosure provides a system and method for vehicle inspection. The system and method may control moving of a vehicle in an unmanned state via wireless communication with a wireless terminal installed in a vehicle moved to an inspection line and automatically performing inspection for each process via vision recognition using a camera.

In one aspect of the present disclosure, a system for vehicle inspection installed on an inspection line to inspect an assembled vehicle, includes: a wireless terminal connected to the vehicle and configured to externally transmit vehicle state information; an antenna arranged on the inspection line and configured to relay wireless communication of the wireless terminal; a camera arranged upwardly along the inspection line and configured to transmit image information of a photographed vehicle; and a server configured to set a coordinates system and a reference driving line on the inspection line, to generate drive control information based on the image information and the vehicle state information such that the vehicle moves along the reference driving line; and to transmit the drive control information to the wireless terminal.

In addition, the wireless terminals may be wireless on-board diagnostics (OBD), may be configured to transmit vehicle state information that is collected from a vehicle controller to the server, and to transmit the drive control information to the vehicle controller.

In addition, the vehicle state information may include at least one of vehicle identification information, vehicle steering information, or vehicle speed.

In addition, the antenna may be configured to perform at least one short-distance wireless communication of WiFi, wireless local area network (LAN), Bluetooth, infrared data association (IrDA), radio frequency (RF), near field communication (NFC), or ZigBee.

The wireless terminal may be configured to transmit the drive control information to the vehicle controller, wherein the drive control information may include at least one control command of the vehicle speed, a steering direction of a motor-driven power steering (MDPS), or a steering angle of the MDPS.

The coordinates system may include a process boundary line configured to define each process region in the inspection line, and the reference driving line configured to guide the vehicle to a center of the process boundary line based on absolute coordinates.

The server may include: a communicator configured to receive the vehicle state information from the wireless terminal and to transmit the drive control information to the wireless terminal; an interface unit connected to the camera and configured to collect the image information captured in real time; a position checker configured to analyze the image information and to detect vehicle positional information on the coordinates system; a storage configured to store various data and programs for inspection of the vehicle; and a controller configured to generate the drive control information and to control the vehicle such that the vehicle moves at a constant speed along the reference driving line, wherein the drive control information includes at least one of steering control information or the vehicle speed.

The position checker may be configured to detect the vehicle positional information including at least one of a central coordinate of the vehicle on the coordinates system, a distance of the central coordinate from the reference driving line, or an angle of a tilted from the reference driving line.

The central coordinate of the vehicle may be coordinates that a horizontal central line and a vertical central line intersect based on an image shape of the vehicle extracted from the image information.

The position checker may be configured to check the distance of the central coordinate from the reference driving line in a horizontal direction; and to check the angle of the tilted vehicle from the reference driving line.

The controller may be configured to determine a first steering direction and a first steering angle such that the central coordinate of the vehicle matches the reference driving line at the first steering direction and the first steering angle; and to generate the drive control information when the distance of the central coordinate of the vehicle from the reference driving line exceeds a predetermined distance.

The controller may be configured to determine a second steering direction and a second steering angle such that the angle of the tilted vehicle matches the reference driving line at the second steering direction and the second steering angle, and to generate the drive control information when the angle of the tilted vehicle from the reference driving line exceeds a predetermined angle.

When the vehicle is in a standby process after failing an inspection, the controller may be configured to generate a repair event, to move the vehicle to a repair process, to repair the vehicle, and to return the vehicle to the standby process.

The controller may be configured to detect an entry of the vehicle into the process boundary line and an exit of the vehicle from the process boundary line utilizing vision recognition of the camera and the position checker.

The server may be configured to transmit a stop signal of a P transmission and a brake to the wireless terminal when any one of events occurs, wherein the events include an emergency switch from an associated apparatus, communication disruption, a system error, and unapproved intrusion into a process.

Meanwhile, another aspect of the present disclosure provides a method of vehicle inspection of a server installed on an inspection line with a camera and an antenna arranged thereon for performing inspection while moving the vehicle via wireless communication with a wireless terminal installed in an assembled vehicle. The method includes: collecting image information from the camera and vehicle state information from a wireless terminal; analyzing the image information to detect vehicle positional information on a coordinates system that is set on an inspection line; transmitting drive control information to the wireless terminal such that the vehicle moves along a reference driving line on the coordinates system, wherein the drive control information is based on the vehicle positional information and the vehicle state information; and when the vehicle positional information deviates from the reference driving line, transmitting the drive control information including a steering direction and steering angle, wherein the vehicle positional information matches the reference driving line at the steering direction and the steering angle.

Analyzing the image information may include: detecting a central coordinate of the vehicle that a horizontal central line and a vertical central line intersect based on an image shape of the vehicle extracted from the image information; detecting a distance of the central coordinate from the reference driving line; and detecting an angle of a tilted vehicle from the reference driving line.

In addition, transmitting the drive control information may include: determining that the vehicle deviates from the reference driving line when the distance of the central coordinate of the vehicle from the reference driving line exceeds a predetermined distance, and determining that the vehicle deviates from the reference driving line when the angle of the tilted vehicle from the reference driving line exceeds a predetermined angle.

The method may further include controlling the vehicle to enter a process boundary line on the coordinates system along the reference driving line; performing an inspection process or a standby process; and moving the vehicle to the process boundary line.

Controlling the vehicle may include moving the vehicle to a repair process, and repairing the vehicle, and returning the vehicle to the standby process when the vehicle is in the standby process after failing an inspection.

In some forms of the present disclosure, an unmanned vehicle may be moving along an inspection line and may be inspected for each process and, thus, a large-sized installation such as a conveyer, a transfer, and a turntable, for transferring vehicles in a factory may be omitted, thereby reducing investment costs.

In addition, an operating time of a conveyor, a transfer, and a turntable may be reduced and a repair process using a turntable may be omitted, thereby reducing a cycle time of an inspection process.

Moreover, process entering and leaving of a vehicle may be automatically detected via vision recognition using a camera and, thus, a conventional vehicle entering and leaving sensor installed for each process may be omitted and a function of the sensor may be replaced.

Other effects to be acquired or predicted in some forms of the present disclosure will be indirectly or implicitly described in the following detailed description. That is, various effects predicted in some forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 9 is a schematic flowchart of a method for vehicle inspection.

Figure 1:
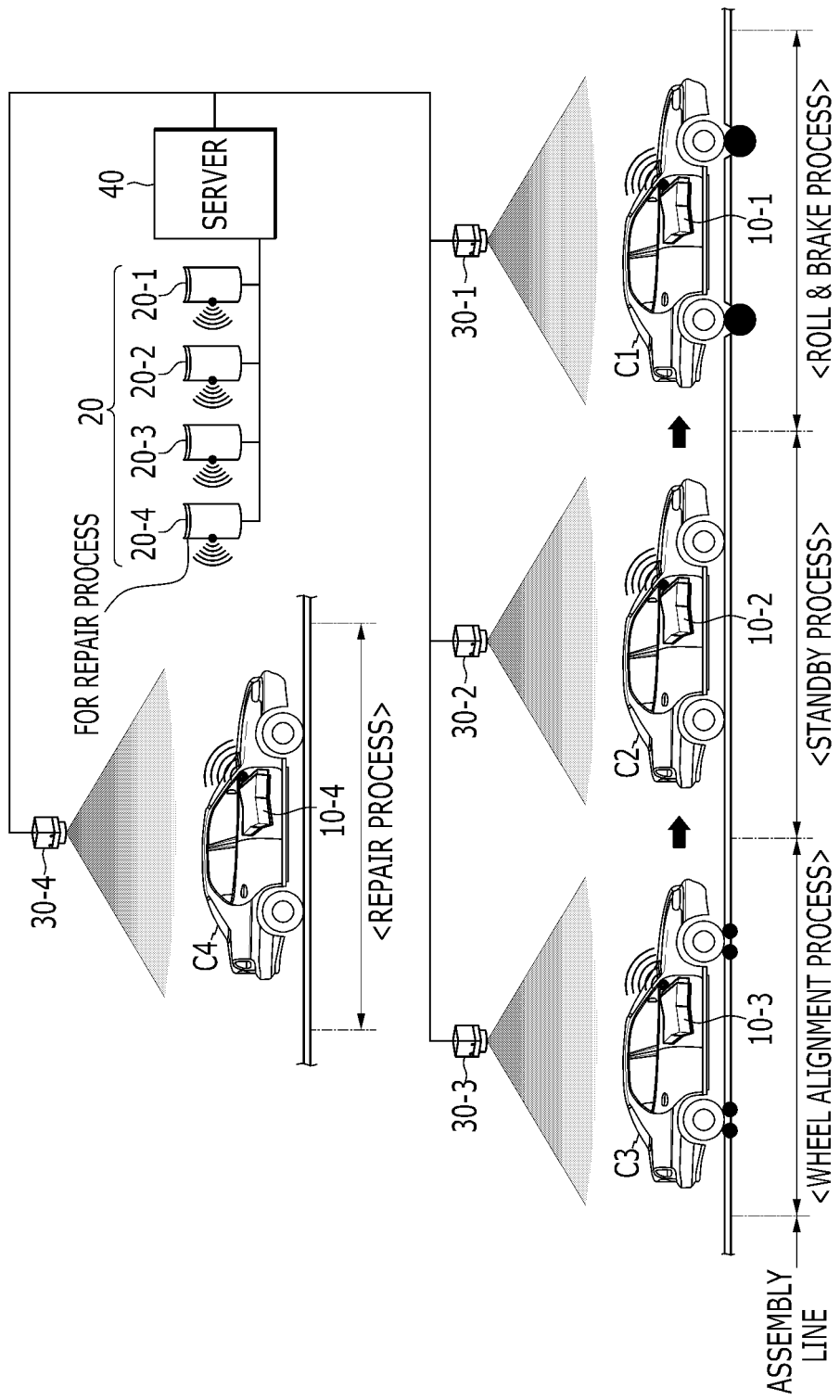
FIG. 1 is a schematic diagram showing a configuration of a system for vehicle inspection.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail so as for those of ordinary skill in the art to easily implement with reference to the accompanying drawings. However, the present disclosure may be implemented in various different forms and is not limited to these forms. To clearly describe the present disclosure, a part without concerning to the description is omitted in the drawings, and like reference numerals in the specification denote like elements.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Throughout the specification, although the terms first, second, etc. may be used herein to describe various elements, these elements should not be limited by these terms. These terms are only used to distinguish one element from another element. For example, a first element may be termed a second element and a second element may be termed a first element without departing from the teachings of the present disclosure.

Hereinafter, a system and method for vehicle inspection will be described with regard to exemplary forms of the disclosure with reference to the attached drawings.

FIG. 1 is a schematic diagram showing a configuration of a system for vehicle inspection in some forms of the present disclosure.

Figure 2:
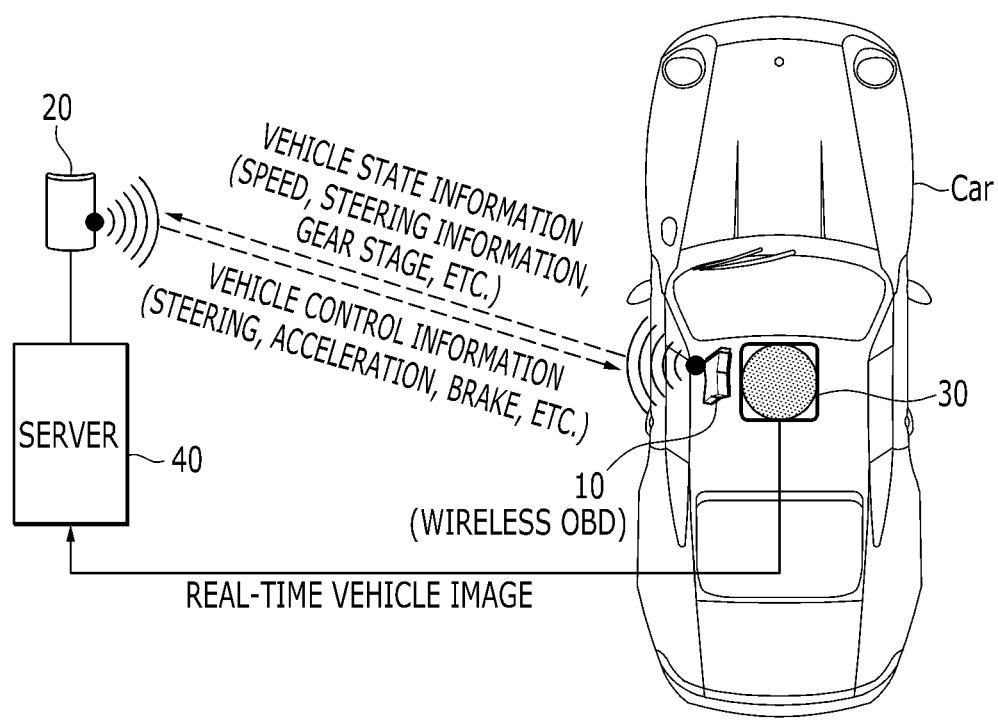
FIG. 2 shows information on data transmission and reception between a vehicle and a server.

FIG. 2 shows information on data transmission and reception between a vehicle and a server in some forms of the present disclosure.

Referring to FIGS. 1 and. 2, the system for vehicle inspection in some forms of the present disclosure may be a system for performing inspection for each process while moving a vehicle assembled through an assembly line along a central line for each process of an inspection line.

Here, the inspection line is a process line for inspection of a component assembly state and operating performance of the vehicle and includes an inspection process of a wheel alignment process and a roll & brake process, a standby process, a repair process, etc.

The wheel alignment process is a process for checking whether a steering device of a vehicle is abnormal, and the roll & brake process and the repair process are a process for checking whether a power system and a brake device are abnormal. The standby process is a process in which a vehicle is on standby to be moved from one inspection process to a next inspection process between the inspection processes, and the repair process is a process of circuitously repairing an event vehicle with a problem in terms of an inspection result.

In addition, the system for vehicle inspection in some forms of the present disclosure performs inspection while 'moving' a vehicle but not 'transferring' the vehicle, which means that a vehicle is inspected while remotely performing moving control (hereinafter, which has the same meaning as 'drive control') of the vehicle in an unmanned state for each process without a conventional vehicle transfer device such as a conveyer, a transfer, and a turntable and a worker for driving a vehicle.

Accordingly, the system for vehicle inspection in some forms of the present disclosure will be described below in terms of a method of performing moving control of an unmanned vehicle and inspection for each process.

The system for vehicle inspection installed on an inspection line to inspect an assembled vehicle in some forms of the present disclosure may include a wireless terminal 10, an antenna 20, a camera 30, and a server 40.

The wireless terminal 10 may be installed in each vehicle moved along an inspection line, and a unique ID and vehicle identification information may be matched.

As shown in FIG. 1, the wireless terminal 10 may include first to fourth wireless terminals 10-1 to 10-4, and the first wireless terminal 10-1, the second wireless terminal 10-2, the third wireless terminal 10-3, and the fourth wireless terminal 10-4 may be installed in a first vehicle C1, a second vehicle C2, a third vehicle C3, and a fourth vehicle C4, respectively.

The wireless terminal 10 may be connected to a vehicle controller (not shown) through a connector and may include a wireless communication module (not shown) to transmit vehicle state information to the server 40 through the antenna 20 and to receive drive control information of a vehicle from the server 40 through the antenna 20.

Here, the vehicle state information may include vehicle identification information, vehicle speed, vehicle steering information, etc., which are referred to by drive control of a vehicle.

The vehicle identification information may be information for identifying a vehicle, such as a vehicle identification number (VIN) and may include a combination of a letter, a number, a sign, etc. The vehicle speed may refer to moving speed of a vehicle in response to an acceleration change. The steering information may include a steering angle indicating a left/right rotation amount of a steering wheel and an angular speed indicating rotation speed of a steering wheel.

The wireless terminal 10 may transmit vehicle state information collected from a vehicle controller through the antenna 20, may transmit the vehicle drive control information received through the antenna 20 to the vehicle controller, and may support the server 40 to sequentially perform moving control of a vehicle along a reference driving line for each process of an inspection line.

The wireless terminal 10 may be on-board diagnostics (OBD).

A plurality of antennas 20 may be arranged along the inspection line to relay wireless communication between the server 40 and the wireless terminal 10 installed in the vehicle. For example, as shown in FIG. 1, the antenna 20 may include first to fourth antennas 20-1 to 20-4 for supporting wireless communication of the wireless terminals 10-1 to 10-4 for respective vehicles moved along the inspection line.

In this case, the antenna 20 may perform at least one short-distance wireless communication of WiFi, wireless LAN, Bluetooth, infrared data association (IrDA), radio frequency (RF), near field communication (NFC), and ZigBee.

The camera 30 may photograph a vehicle moved along the inspection line and may transmit the captured image information to the server 40.

The camera 30 may be fixedly arranged above the inspection line to form a coordinates system and may function as an image sensor for detecting a position and coordinates of a vehicle moved along the inspection line.

As shown in FIG. 1, the camera 30 may include first to fourth cameras 30-1 to 30-4 arranged for each process included in the inspection line.

For example, the first camera 30-1 may photograph the first vehicle C1 positioned in the wheel alignment process, the second camera 30-2 may photograph the second vehicle C2 positioned in the standby process, the third camera 30-3 may photograph the third vehicle C3 positioned in the roll & brake process, and the fourth camera 30-4 may photograph the fourth vehicle C4 positioned in the repair process.

The server 40 may be a computer apparatus for controlling an overall operation of installations for moving and inspection control for each process according to a vehicle position on the inspection line.

The server 40 may set a coordinates system and a driving line on the inspection line, may generate drive control information for moving the vehicle along the reference driving line on the coordinates system based on the collected image information and vehicle state information, and may transmit the drive control information to the wireless terminal 10 through the antenna 20.

Figure 3:
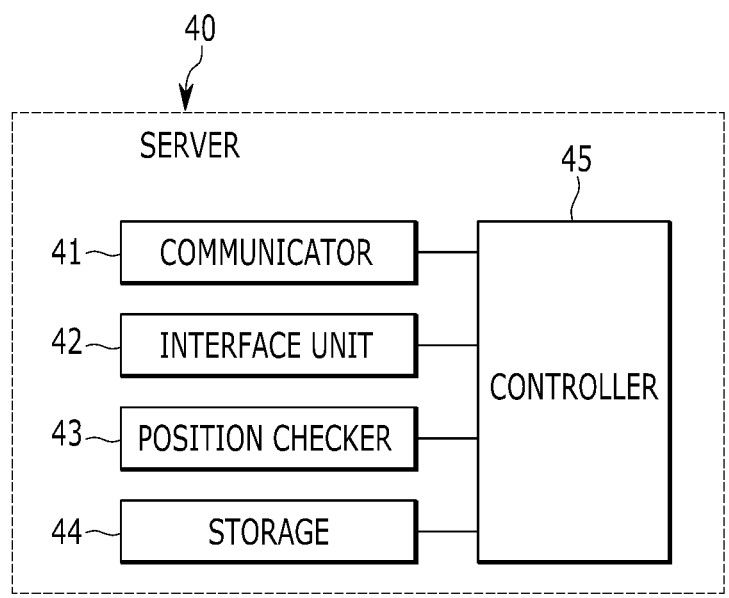
FIG. 3 is a schematic block diagram showing a configuration of a server.

FIG. 3 is a schematic block diagram showing a configuration of a server in some forms of the present disclosure.

Referring to FIG. 3, the server 40 in some forms of the present disclosure may include a communicator 41, an interface unit 42, a position checker 43, a storage 44, and a controller 45.

The communicator 41 may receive vehicle state information through the antenna 20 and may transmit the drive control information for controlling the corresponding vehicle to the wireless terminal 10 of the vehicle through the antenna 20 according control of the controller 45.

The interface unit 42 may be connected to the camera 30 and may collect image information captured in real time.

The position checker 43 may include a vision system that is operatively associated with the camera 30 and may analyze the collected image information to detect the vehicle positional information on the inspection as a reference of vehicle moving control of the controller 45. The position checker 43 may function as if a driver acquires visual information for driving a vehicle by a driver, which will be described below with reference to FIG. 4.

Figure 4:
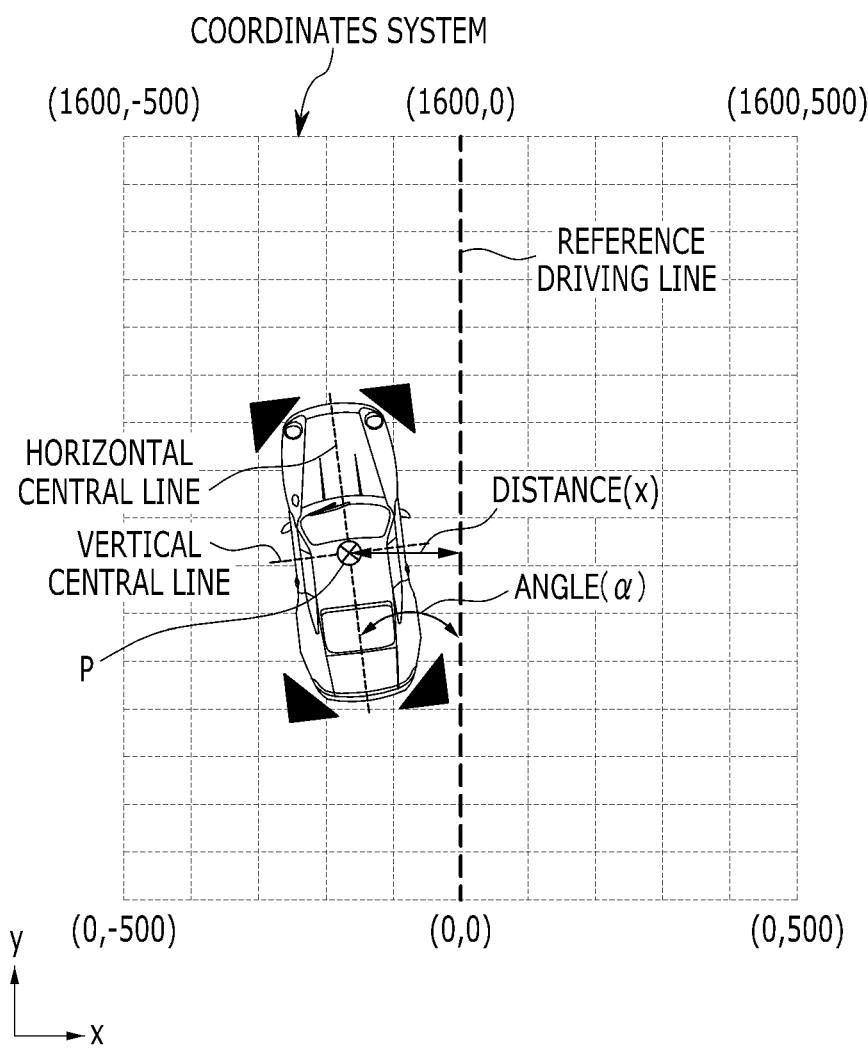
FIG. 4 is a diagram showing an example of detecting vehicle positional information from image information.

FIG. 4 is a diagram showing an example of detecting vehicle positional information from image information in some forms of the present disclosure.

Referring to FIG. 4, the position checker 43 in some forms of the present disclosure may store a coordinates system of an inspection line that is set based on image information of a fixed camera. The coordinates system may include a process boundary line for defining each process region in the inspection line and a reference driving line for guiding moving of the vehicle to a center of the process boundary line based on absolute coordinates on the inspection line.

That is, the coordinates system may be referred to by drive control such as vehicle steering, acceleration, brake, etc. of the server 40 by setting the reference process boundary line for positioning the vehicle for each process and the virtual driving line for moving control of the vehicle.

The position checker 43 may analyze the image information collected in real time to detect vehicle positional information on the coordinates system.

The vehicle positional information may include central coordinate P of the vehicle, a distance x of the central coordinate from the reference driving line, and an angle α at which the vehicle is tilted based on the reference driving line.

The central coordinate P may be detected as coordinates at which a horizontal central line and a vertical central line intersect based on an image shape of the vehicle, extracted from the image information. Here, the horizontal central line and the vertical central line may be used to calculate a planar area of the vehicle.

In addition, the distance x of the central coordinate from the reference driving line may be detected by calculating a distance by which the central coordinate of the vehicle is spaced apart in parallel from the reference driving line on the coordinates system in an x direction.

The angle α at which the vehicle is tilted may be detected as an angle at which a vertical central line of the vehicle is tilted from the reference driving line of the coordinates system.

The position checker 43 may store a position of an installation (e.g., a driving roller) for each process on the coordinates system and may detect an event of intrusion of an unapproved intruder or object.

The storage 44 may store various data and programs for inspection of a vehicle that enters the inspection line and may store data generated via vehicle inspection.

For example, the storage 44 may store the coordinates system formed on the inspection line and may store installation positional information on the coordinates system. The storage 44 may match and store an ID of the wireless terminal 10 and the vehicle identification information and may store an inspection result in response to movement for each process of the vehicle including the wireless terminal 10 installed therein.

The controller 45 is a central processing device for controlling an overall operation of each of the above components for vehicle inspection in some forms of the present disclosure.

The controller 45 may match the vehicle positional information detected by the position checker 43 and the ID of the wireless terminal 10 and may track a position of the vehicle to which the wireless terminal 10 is attached.

The controller 45 may perform moving control to move the vehicle at constant speed along the reference driving line on the coordinates system based on the vehicle positional information and vehicle state information.

Here, the controller 45 performs moving control of the vehicle, which means that the controller 45 generates drive control information including at least one of steering control information (moving direction) and moving speed of the vehicle and transmits the generated information to the wireless terminal 10 of the vehicle.

Figure 6:
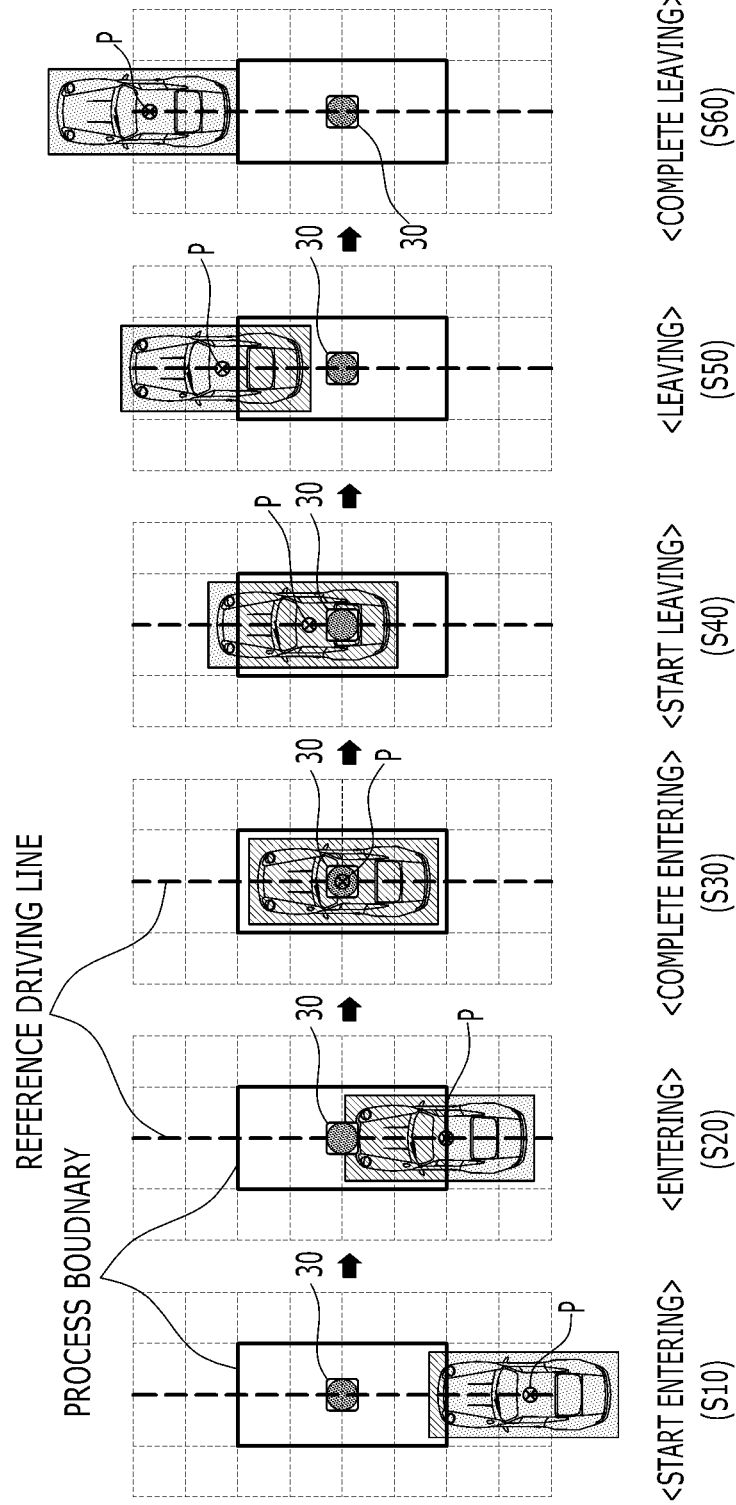
FIG. 6 is a diagram showing a method of recognizing process entering and leaving of a vehicle.

For example, as shown in FIG. 6, the controller 45 may determine a steering direction and a steering angle for correcting the central coordinate P of the vehicle to be matched with the reference driving line and may generate the drive control information when the distance X of the central coordinate P of the vehicle from the reference driving line on the coordinates system exceeds a predetermined distance (e.g., 100 mm).

The controller 45 may determine a steering direction and a steering angle for correcting the angle α to be matched with the reference driving line on the coordinates system and may generate the drive control information when the angle α at which the vehicle is tilted from the reference driving line of the coordinates system exceeds a predetermined angle (e.g., 5°).

In the above description, the predetermined distance and the predetermined angle may be a predetermined value for determining whether the vehicle deviates from reference driving line. For example, the predetermined distance may be set to 100 mm and the predetermined angle may be set to 5° but the present disclosure is not limited thereto and the predetermined distance and the predetermined angle may be changed. The predetermined distance and the predetermined angle may be set through a predetermined algorithm (e.g., a program and a possibility model) or may be set by a worker.

The controller 45 may transmit the drive control information to the wireless terminal 10 through the communicator 41 and may correct the moving direction of the vehicle to match the central coordinate P of the vehicle with the reference driving line.

The drive control information may be transmitted to the vehicle controller through the wireless terminal 10 to adjust a steering direction and steering angle of a motor-driven power steering (MDPS). That is, the MDPS may operate a motor according to the steering direction and the steering angle with reference to a signal detected through a sensor connected to the steering wheel and may correct a moving direction of the vehicle.

Figure 5:
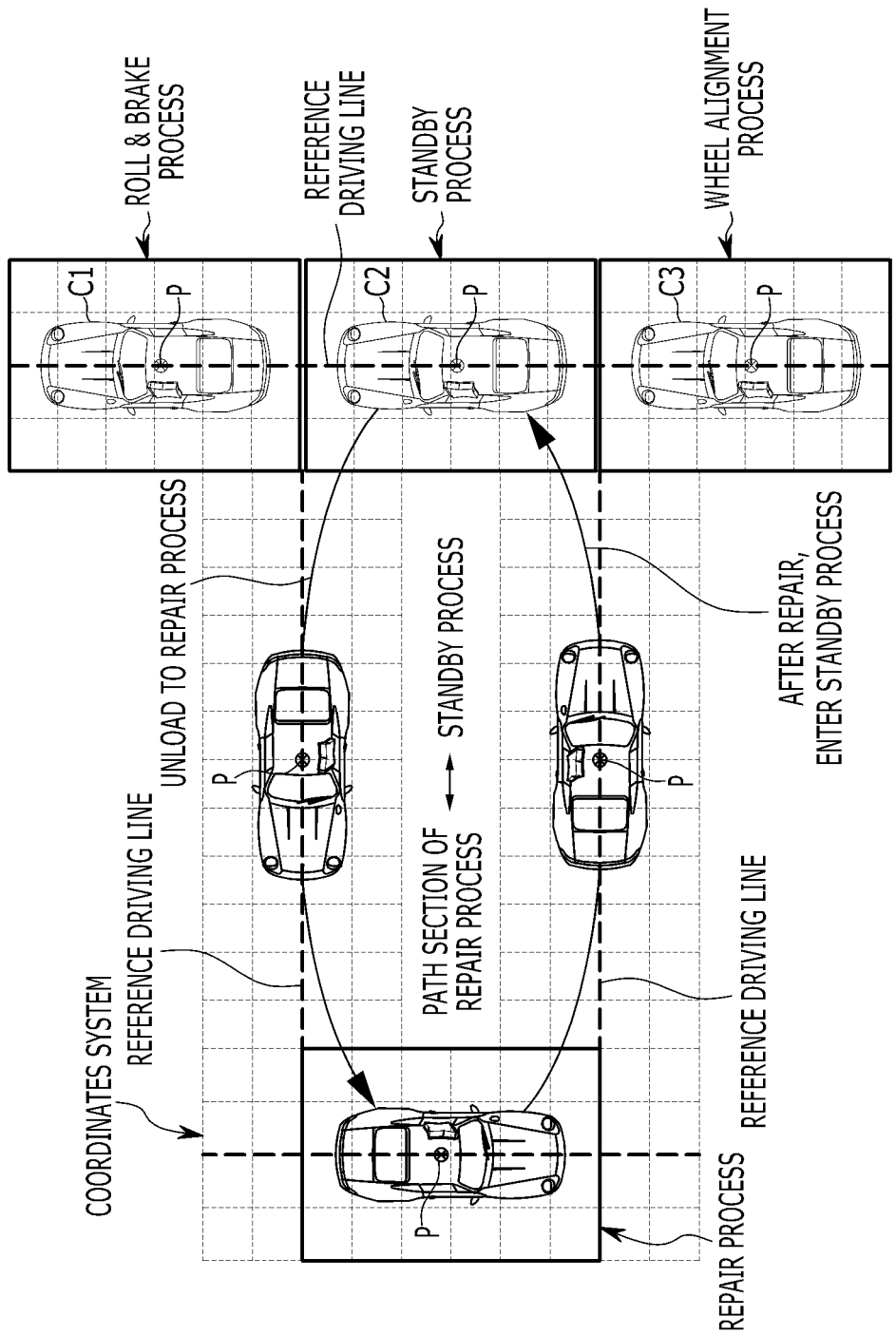
FIG. 5 is a diagram showing an example of moving control of a vehicle for each process on a coordinates system.

FIG. 5 is a diagram showing an example of moving control of a vehicle for each process on a coordinates system in some forms of the present disclosure.

Referring to FIG. 5, the controller 45 in some forms of the present disclosure may control the vehicle to be sequentially moved along the reference driving line on the coordinates system formed over all processes of the inspection line and a moving path between processes.

When an inspection result of a vehicle positioned in a standby process fails after one inspection is finished, the controller 45 may generate a repair event, may move the corresponding vehicle to a repair process, may repair the vehicle and, then, may move the vehicle to re-enter the standby process.

The repair process may be separately operated only when the repair event occurs.

Accordingly, the controller 45 may sequentially perform moving control of the vehicle at an order of a wheel alignment process, a standby process, a roll & brake process, etc. in a normal state in which a repair event does not occur. Here, the order of the inspection process is not limited thereto and may be changed.

FIG. 6 is a diagram showing a method of recognizing process entering and leaving of a vehicle in some forms of the present disclosure.

Referring to FIG. 6, the controller 45 in some forms of the present disclosure may set a process boundary line for each process on a coordinates system of an inspection line and may detect that the vehicle enters and leaves the process boundary line via vision recognition through the camera 30 and the position checker 43 that are installed at a central portion of the process boundary line.

With regard to each operation, upon checking that a front portion of a vehicle moved along a reference driving line enters the process boundary line, the controller 45 may determine that the vehicle starts entering a corresponding process S10.

The controller 45 may determine that the vehicle that has already entered the process boundary line is entering the process boundary line when the vehicle is over the process boundary line (S20) and may determine that the vehicle completely enters the process boundary line when the vehicle is within the process boundary line (S30).

In this case, the controller 45 may inspect a vehicle corresponding to the process boundary line or may be on standby to perform a next process.

In the case of a wheel alignment process or a roll & brake process, acceleration control for entering and leaving of the vehicle may be performed as follows.

Figure 7:
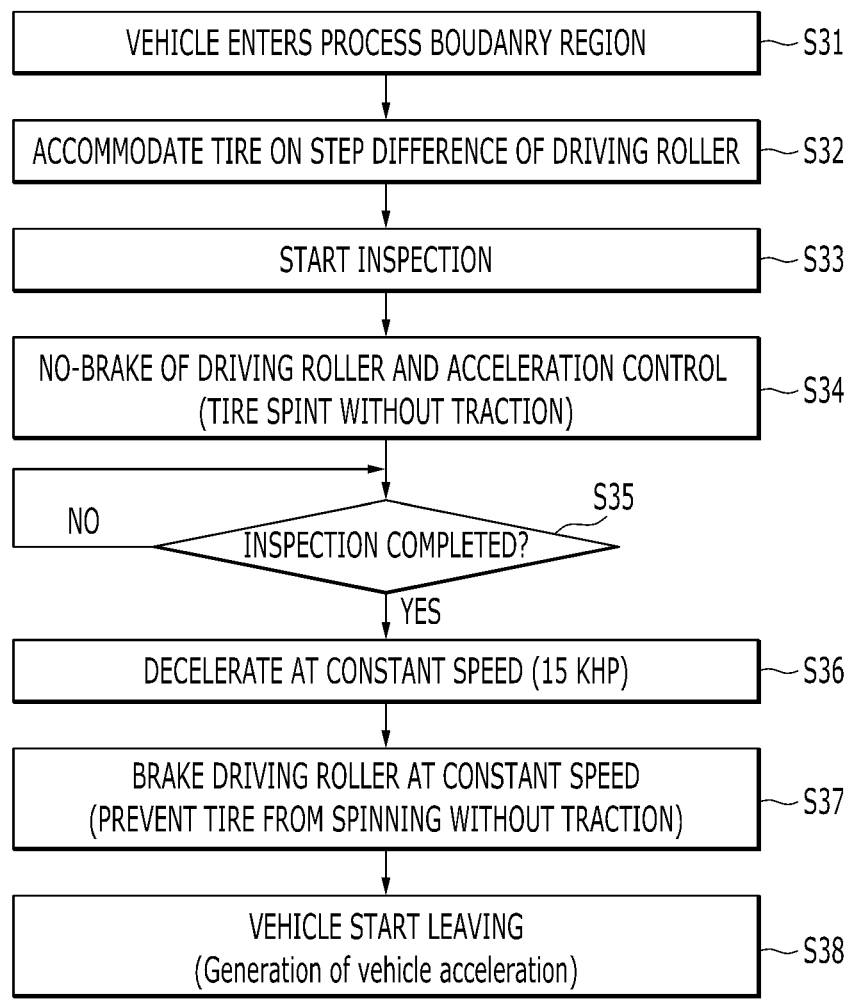
FIG. 7 is a flowchart showing an acceleration control method in entering and leaving of a wheel alignment process of a vehicle.

FIG. 7 is a flowchart showing an acceleration control method in entering and leaving of a wheel alignment process of a vehicle in some forms of the present disclosure.

Figure 8:
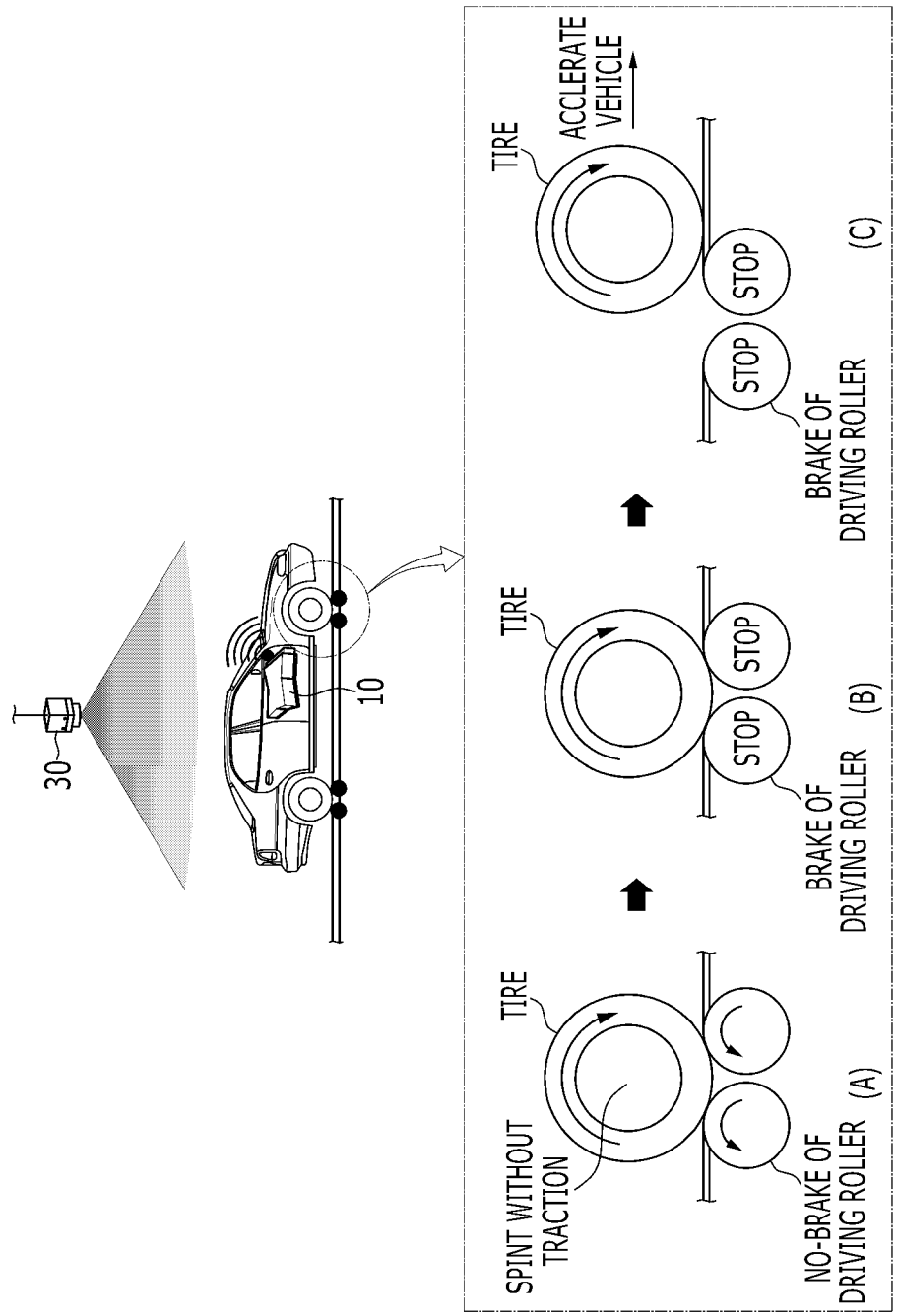
FIG. 8 is a diagram showing an example of a vehicle acceleration method of a wheel alignment process.

FIG. 8 is a diagram showing an example of a vehicle acceleration method of a wheel alignment process in some forms of the present disclosure.

Referring to FIGS. 7 and 8, in some forms of the present disclosure, when a vehicle completely enters a wheel alignment process boundary line (S31) and tires are accommodated on step differences of a driving roller (S32), the controller 45 may start a wheel alignment process of the vehicle (S33). Here, accommodation of the tires of the vehicle on the driving roller may be checked by checking that a tire position of the vehicle is matched with coordinates of an installation of a driving roller. In addition, accommodation may be checked by checking load of a vehicle, applied to each driving roller.

The controller 45 may perform wheel alignment inspection while controlling the driving roller via no-brake and transmitting an acceleration control command to the vehicle to accelerate the vehicle to predetermined inspection speed (S34). In this case, the controller 45 may generate a vehicle acceleration control command required for inspection and may transmit the command to the vehicle controller through the wireless terminal 10 to control vehicle acceleration. In addition, the driving roller in a no-brake state simultaneously rotates and, thus, the tire rotating due to vehicle acceleration may spin without traction.

When inspection is performed via known wheel an alignment inspection apparatus (not shown) while controlling vehicle acceleration and is completed (YES of S35), the controller 45, may perform deceleration control with predetermined safe speed (e.g., 15 kph) for vehicle leaving (S36).

When the vehicle reaches the predetermined speed (e.g., 15 kph), the controller 45 may forcibly stop the driving roller at the predetermined speed (S37). In this case, the tire may be prevented from spinning without traction due to brake of the driving roller and, thus, vehicle acceleration is instantly generated and the tire escapes from the driving roller.

The controller 45 may determine that the vehicle that is completely inspected starts leaving the alignment process boundary line when the vehicle deviates from the wheel alignment process boundary line (S38).

Referring back to FIG. 6, when the vehicle completely enters the process boundary line and then a front portion of the vehicle leaves out of the process boundary line, the controller 45 may determine that the vehicle starts leaving (S40).

When the vehicle that has started leaving is over the process boundary line, the controller 45 may determine that the vehicle is leaving (S50) and, when the vehicle completely deviates from the process boundary line, the controller 45 may determine that the vehicle completely leaves (S60).

In this regard, conventionally, a vehicle entering and leaving sensor is separately installed for each process to detect entering and leaving of the vehicle but the system for vehicle inspection in some forms of the present disclosure may automatically detect that a vehicle enters and leaves a process boundary line every process via vision recognition using the camera 30 and may control the movement and, thus, the conventional vehicle entering and leaving sensor may be omitted and a function thereof may be advantageously replaced.

Based on the aforementioned configuration of the system for vehicle inspection, a method for vehicle inspection using a server in some forms of the present disclosure will be described below with reference to FIGS. 9 and 10. However, the aforementioned components of the server 40 may be integrated or subdivided and, thus, an entity of each process will be assumed to be the server 40 but not the corresponding element with regard to a description of the method for vehicle inspection in some forms of the present disclosure.

FIG. 9 is a schematic flowchart of a method for vehicle inspection in some forms of the present disclosure.

Referring to FIG. 9, with regard to a description of the method for vehicle inspection in some forms of the present disclosure, the server 40 will be assumed to wirelessly communicate with the wireless terminal 10 installed in the vehicle through the antenna 20 to enable unmanned moving control by receiving vehicle state information and transmitting vehicle control information.

The server 40 may collect image information captured by the camera 30 and vehicle state information from the wireless terminal 10 in real time (S101).

The server 40 may analyze the image information to detect vehicle positional information on a coordinates system set on an inspection line (S102). In this case, the server 40 may detect the central coordinate P at which a horizontal central line and a vertical central line intersect, based on an image shape of the vehicle, extracted from the image information. The distance X of the central coordinate P from the reference driving line and the angle $\alpha$ at which the vehicle is tilted from the reference driving line may each be detected.

The server 40 may transmit drive control information generated by referring to the vehicle positional information and vehicle state information to the wireless terminal 10 and may perform moving control on the vehicle to be moved at a predetermined speed to match the vehicle positional information and the reference driving line on the coordinates system (S103).

When the vehicle positional information detected via movement of the vehicle deviates from the reference driving line (YES of S104), the server 40 may determine a steering direction and steering angle for correcting the vehicle positional information to be matched with the reference driving line to generate drive control information of the vehicle (S105).

In this case, upon detecting at least one of the case in which the distance X of the central coordinate P of the vehicle from the reference driving line on the coordinates system exceeds a predetermined distance (e.g., 100 mm) and the case in which the angle $\alpha$ at which the vehicle is tilted from the reference driving line of the coordinates system exceeds a predetermined angle (e.g., 5°), the server 40 may determine that the vehicle deviates from the reference driving line.

The server 40 may transmit the drive control information to the vehicle controller through the wireless terminal 10 and may correct a moving direction (i.e., steering direction) of the vehicle to match the central coordinate P of the vehicle and the reference driving line (S106).

The server 40 may control the vehicle to enter a process boundary line on the coordinates system (S107) and may control an inspection process corresponding to the process boundary line or may be on standby to move the vehicle to a next process (S108). Here, control of the inspection process will be described below with reference to FIGS. 7 and 8.

When the inspection process or the standby process is completed, the server 40 may perform moving control on the vehicle to leave the process boundary line (S109).

When a next process for vehicle inspection is present (YES of S110), the server 40 may perform moving control on the vehicle to be moved to the next process based on the reference driving line and may continuously perform the inspection process (S103).

On the other hand, when vehicle inspection is completed and a next process is not present (NO of S110), the server 40 may perform moving control on the vehicle in a leaving direction of the inspection line to complete inspection.

In operation S104, when the vehicle positional information does not deviate from the reference driving line (NO of S104), the server 40 may omit operations S105 and S106 for correcting the moving direction of the vehicle and may perform operation S107.

Although not shown, when a result of the standby inspection process of the vehicle is failure in operation S108, a repair event occurs, the corresponding vehicle is moved to and is repaired in a repair process and, then, re-enters the standby process, as described with reference to FIG. 5.

As such, in some forms of the present disclosure, an unmanned vehicle may be moving-controlled along an inspection line and may be inspected for each process and, thus, a large-sized installation such as a conveyer, a transfer, and a turntable, for transferring vehicles in a factory may be omitted, thereby reducing investment costs.

In addition, an operating time of a conveyor, a transfer, and a turntable may be reduced and a repair process using a turntable may be omitted, thereby reducing a cycle time of an inspection process.

In addition, process entering and leaving of a vehicle may be automatically detected via vision recognition using a camera and, thus, a conventional vehicle entering and leaving sensor installed for each process may be omitted and a function of the sensor may be replaced.

While this disclosure has been described in connection with what is presently considered to be practical exemplary forms, the present disclosure is not limited to the above exemplary form and other various exemplary forms may be added or changed.

In some forms of the present disclosure, the server 40 collects image information associated with the camera 30 and vehicle state information associated with the wireless terminal 10 and automatically controls an unmanned vehicle based on vehicle position-based information, obtained by analyzing the image information and the vehicle state information.

The automated system for vehicle inspection may cause a big accident when an error of any one of associated apparatuses or a system error occurs and, thus, may perform a vehicle stop function in response to an emergency event.

For example, the emergency event may be the case in which an emergency switch is operated by a worker, the case in which communication disruption (e.g., delay and interruption) with the wireless terminal 10 occurs, the case in which an error occurs in a vision system, and the case in which an unapproved intrusion of a worker or an object is detected in a process.

That is, the server 40 may transmit a stop signal to the vehicle and may immediately stop the vehicle when an error signal is input from any one of associated apparatuses or communication disruption occurs. The stop signal may emergently stop the vehicle via a P transmission and a brake through an electronic speed controller (ESC) of the vehicle.

An emergency stop algorithm is installed in the wireless terminal 10 and, thus, when communication interruption with the server 40 occurs for a predetermined time period, the vehicle may be stopped via a brake and the transmission controller is emergently stopped using a P transmission.

Upon detecting intrusion of a worker or an object into an inspection line along which the vehicle is moved, from the image information of the camera 30, the server 40 may transmit the stop signal to the vehicle and may immediately stop the vehicle.

The system for vehicle inspection in some forms of the present disclosure may perform a vehicle stop function in response to an emergency event and, thus, may advantageously remove unstable factors from automation and manage a safe process.

A vehicle moving control configuration of the system for vehicle inspection in some forms of the present disclosure is not limited to the inspection line and may be extensively applied to other vehicle production lines.

For example, a camera and an antenna may be further arranged on a moving path from an assembly line to an inspection line to form a coordinates system and a wireless terminal is installed in a vehicle from the assembly line to advantageously control moving of a vehicle that is completely assembled, even the moving path.

The exemplary forms of the present disclosure can be implemented via a program for performing a function corresponding to a configuration of the exemplary forms of the present disclosure, a recording medium with the program recorded thereon, etc. as well as via the aforementioned apparatus and/or method and this implementation can be easily achieved from the above description by one of ordinary skill in the art.

The description of the disclosure is merely exemplary in nature and thus, variations that do not depart from the substance of the disclosure are intended to be within the scope of the disclosure. Such variations are not to be regarded as a departure from the spirit and scope of the disclosure.

DESCRIPTION OF SYMBOLS

10: wireless terminal
20: antenna
30: camera
40: server
41: communicator
42: interface unit
43: position checker
44: storage
45: controller
C: vehicle
P: central coordinate

What is claimed is:

1. A system for vehicle inspection installed on an inspection line to inspect an assembled vehicle, the system comprising:
    a wireless terminal connected to the vehicle and configured to externally transmit vehicle state information;
    an antenna arranged on the inspection line and configured to relay wireless communication of the wireless terminal;
    a camera arranged above and along the inspection line and configured to transmit image information of a photographed vehicle; and
    a server configured to:
        set a coordinates system and a reference driving line on the inspection line;
        generate drive control information based on the image information and the vehicle state information such that the vehicle moves along the reference driving line; and
        transmit the drive control information to the wireless terminal.

2. The system for vehicle inspection of claim 1, wherein the wireless terminal is configured to:
    transmits vehicle state information that is collected from a vehicle controller to the server; and
    transmit the drive control information to the vehicle controller, wherein the wireless terminal is wireless on board diagnostics (OBD).

3. The system for vehicle inspection of claim 1, wherein:
    the vehicle state information comprises at least one of vehicle identification information, vehicle steering information, or vehicle speed.

4. The system for vehicle inspection of claim 1, wherein:
    the antenna is configured to perform at least one of short-distance wireless communication of WiFi, wireless local area network (LAN), Bluetooth, infrared data association (IrDA), radio frequency (RF), near field communication (NFC), or ZigBee.

5. The system for vehicle inspection of claim 1, wherein:
    the wireless terminal is configured to transmit the drive control information to a vehicle controller, wherein the drive control information comprises at least one of control command of the vehicle speed, a steering direction of a motor-driven power steering (MDPS) or a steering angle of the MDPS.

6. The system for vehicle inspection of claim 1, wherein the coordinates system comprises:
    a process boundary line configured to define each process region in the inspection line; and
    the reference driving line configured to guide the vehicle to a center of the process boundary line based on absolute coordinates.

7. The system for vehicle inspection of claim 1, wherein the server comprises:
    a communicator configured to receive the vehicle state information from the wireless terminal and to transmit the drive control information to the wireless terminal;
    an interface unit connected to the camera and configured to collect the image information captured in real time;
    a position checker configured to analyze the image information and to detect vehicle positional information on the coordinates system;
    a storage configured to store various data and programs for inspection of the vehicle; and
    a controller configured to generate the drive control information and to control the vehicle such that the vehicle moves at a constant speed along the reference driving line, wherein the drive control information comprises at least one of steering control information or the vehicle speed.

8. The system for vehicle inspection of claim 7, wherein:
    the position checker is configured to detect the vehicle positional information, wherein the vehicle positional information comprises at least one of a central coordinate of the vehicle on the coordinates system, a distance of the central coordinate from the reference driving line, or an angle of a tilted vehicle from the reference driving line.

9. The system for vehicle inspection of claim 8, wherein:
the central coordinate of the vehicle is a coordinate that a horizontal central line and a vertical central line intersect based on an image shape of the vehicle extracted from the image information.

10. The system for vehicle inspection of claim 8, wherein the position checker is configured to:
check the distance of the central coordinate from the reference driving line in a horizontal direction; and
check the angle of the tilted vehicle from the reference driving line.

11. The system for vehicle inspection of claim 8, wherein, when the distance of the central coordinate of the vehicle from the reference driving line exceeds a predetermined distance, the controller is configured to:
determine a first steering direction and a first steering angle such that the central coordinate of the vehicle matches the reference driving line at the first steering direction and the first steering angle; and
generate the drive control information.

12. The system for vehicle inspection of claim 8, wherein, when the angle of the tilted vehicle from the reference driving line exceeds a predetermined angle, the controller is configured to:
determine a second steering direction and a second steering angle such that the angle of the tilted vehicle matches the reference driving line at the second steering direction and the second steering angle; and
generate the drive control information.

13. The system for vehicle inspection of claim 8, wherein, when the vehicle is in a standby process after failing an inspection, the controller is configured to:
generate a repair event;
move the vehicle to a repair process;
repair the vehicle; and
return the vehicle to the standby process.

14. The system for vehicle inspection of claim 8, wherein:
the controller is configured to detect an entry of the vehicle into the process boundary line and an exit of the vehicle from a process boundary line utilizing vision recognition of the camera and the position checker.

15. The system for vehicle inspection of claim 1, wherein:
the server is configured to transmit a stop signal of a P transmission and a brake to the wireless terminal when any one of events occurs, wherein the events comprise an emergency switch from an associated apparatus, communication disruption, a system error, and unapproved intrusion into a process.

16. A method of vehicle inspection for inspecting an assembled vehicle, the method comprising:
collecting image information from a camera and vehicle state information from a wireless terminal;
analyzing the image information to detect vehicle positional information on a coordinates system that is set on an inspection line;
transmitting drive control information to the wireless terminal such that the vehicle moves along a reference driving line on the coordinates system, wherein the drive control information is based on the vehicle positional information and the vehicle state information; and
when the vehicle positional information deviates from the reference driving line, transmitting the drive control information including a steering direction and a steering angle, wherein the vehicle positional information matches the reference driving line at the steering direction and the steering angle,
wherein the camera is arranged above and along the inspection line and is configured to transmit the image information of a photographed vehicle, and
wherein the wireless terminal is connected to the vehicle and is configured to externally transmit the vehicle state information.

17. The method of claim 16, wherein analyzing the image information comprises:
detecting a central coordinate of the vehicle that a horizontal central line and a vertical central line intersect based on an image shape of the vehicle extracted from the image information;
detecting a distance of the central coordinate from the reference driving line; and
detecting an angle of a tilted vehicle from the reference driving line.

18. The method of claim 17, wherein transmitting the drive control information comprises:
determining that the vehicle deviates from the reference driving line when the distance of the central coordinate of the vehicle from the reference driving line exceeds a predetermined distance; and
determining that the vehicle deviates from the reference driving line when the angle of the tilted vehicle from the reference driving line exceeds a predetermined angle.

19. The method of claim 18, wherein the method further comprises:
controlling the vehicle to enter a process boundary line on the coordinates system along the reference driving line;
performing an inspection process or a standby process; and
moving the vehicle to the process boundary line.

20. The method of claim 19, wherein controlling the vehicle comprises:
moving the vehicle to a repair process;
repairing the vehicle; and
returning the vehicle to the standby process when the vehicle is in the standby process after failing an inspection.

* * * * *